United States Patent [19]

Teshima et al.

[11] Patent Number: 4,755,933
[45] Date of Patent: Jul. 5, 1988

[54] DATA PROCESSOR SYSTEM HAVING LOOK-AHEAD CONTROL

[75] Inventors: Tooru Teshima, Yokohama; Tetsuo Urushihara, Sagamihara, both of Japan

[73] Assignee: Fujitsu Limited, Kawasaki, Japan

[21] Appl. No.: 792,607

[22] Filed: Oct. 29, 1985

[30] Foreign Application Priority Data

Nov. 1, 1984 [JP] Japan ............................... 59-230527

[51] Int. Cl.$^4$ ............................................. G06F 9/00
[52] U.S. Cl. .................................................. 364/200
[58] Field of Search ................................ 364/200, 900

[56] References Cited

U.S. PATENT DOCUMENTS

| | | | |
|---|---|---|---|
| 3,866,180 | 2/1975 | Willette | 364/200 |
| 3,967,247 | 6/1976 | Andersen et al. | 364/200 |
| 4,214,303 | 7/1980 | Joyce et al. | 364/200 |
| 4,381,541 | 4/1983 | Baumann, Jr. et al. | 364/200 |
| 4,438,493 | 3/1984 | Cushing et al. | 364/200 |
| 4,439,827 | 3/1984 | Wilkes | 364/200 |
| 4,600,986 | 7/1986 | Scheuneman et al. | 364/200 |
| 4,617,624 | 10/1986 | Goodman | 364/200 |
| 4,621,320 | 11/1986 | Holste et al. | 364/200 |

FOREIGN PATENT DOCUMENTS

| | | |
|---|---|---|
| 44-17192 | 7/1969 | Japan . |
| 45-16193 | 6/1970 | Japan . |
| 51-4382 | 2/1976 | Japan . |
| 54-40180 | 12/1979 | Japan . |

*Primary Examiner*—Gareth D. Shaw
*Assistant Examiner*—John G. Mills
*Attorney, Agent, or Firm*—Staas & Halsey

[57] ABSTRACT

A data processor system is set up with, at least, a main memory and a central control unit. The main memory stores therein instructions to be executed by the central control unit. The main memory contains therein an even part buffer and an odd part buffer which momentarily store prefetch instructions of even addresses and odd addresses, respectively. The thus buffered prefetch instructions are sequentially fed from these two buffers alternately to the central control unit.

11 Claims, 12 Drawing Sheets

DATA PROCESSOR SYSTEM HAVING LOOK-AHEAD CONTROL

BACKGROUND OF THE INVENTION

1. Field of the Invention

The present invention relates to a data processor system having look-ahead control. That is, the system is operated under an advanced control method by using prefetched instructions.

2. Description of the Related Art

The data processing capability, such as the processing speed, of a cental control unit (CC) used in a data processor system is determined by various factors. In a so-called Neumann-type data processor, in particular, the processing time of the data processor is largely accounted for by the access time necessary for accessing a main memory (MM) used in the data processor system.

In order to shorten the access time for high-speed processing, a variety of techniques have been proposed. One of these is a hierarchal memory. A typical hierarchal memory is a cache memory, which dramatically increases the operation speed of the data processor.

The cache memory method is, however, not preferable in view of software design freedom due to the variety of conditional restrictions necessary to be considered. More specifically, it is very important whether or not each desired or intended piece of data actually exists in the cache memory. This is usually defined as a "hit rate". Further, the cache memory must be fabricated as a high-speed memory, which necessarily increases the cost of the related data processor system.

In view of the above, it has long been hoped to realize a data processor system that is highly cost effective in performance, i.e., a low price data processor system however able to be operated with a very short instruction access time and high processing speed.

It is generally known to adopt the so-called bank division method in a data processor system for the purpose of speeding up the access to a main memory (MM) thereof. Further, it is generally known to adopt the so-called look-ahead method in a data processor system for the purpose of speeding up the process achieved by the central control unit (CC). The look-ahead method uses prefetched instructions by utilizing the fact that a series of instructions are usually stored sequentially one by one in the main memory (MM). A combination of the bank division method and the look-ahead method would be most preferable in increasing the operation speed of the overall data processing system.

In the prior art, there are two known method for performing look-ahead control, each of which methods will be explained in detail hereinafter. These two methods, however, each have their own disadvantages. The first method has the disadvantage that the higher the operation speed of the central control unit (CC), the lower the capability of look-ahead control. The second method has the disadvantage that the number of the interface lines in a memory bus between the main memory (MM) and the central control unit (CC) becomes very large.

SUMMARY OF THE INVENTION

Accordingly, an object of the present invention is to provide a data processor system having improved look-ahead control relative to the known look-ahead control and, thus, to cancel the above-discussed disadvantages of the prior art.

To attain the above object, a main memory (MM) according to the present invention is constructed as follows: First, the memory MM is set up mainly with an even memory bank specified by even addresses and an odd memory bank specified by odd addresses. The even and odd banks can operate independently from each other. Second, each of the even and odd banks is provided with its own buffer storing the prefetched instructions, i.e., an even prefetch buffer and an odd prefetch buffer. Each of the buffers sequentially stores the instructions supplied from the main memory in advance before each instruction fetch request commanded by the central control unit (CC). Then a memory control logic circuit, mounted inside the memory (MM), operates to issue the instructions from the even and odd buffers alternately to the central control unit (CC).

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
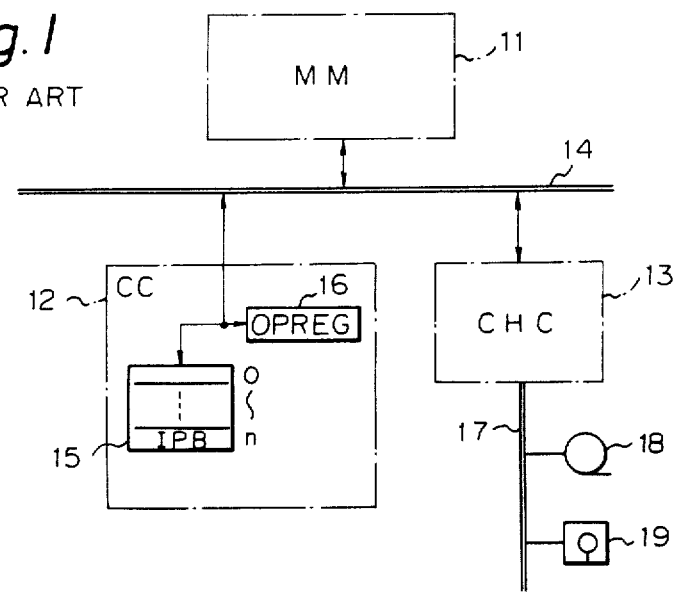
FIG. 1 illustrates a data processor system operated under look-ahead control according to a prior art method.

FIG. 1 illustrates a data processor system operated under look-ahead control according to a prior art method. In FIG. 1, a main memory (MM) 11, a central control unit (CC) 12, and a channel control unit (CHC) 13 are commonly connected to a memory bus 14. The unit (CHC) 13 is further connected to a common bus 17 which is provided with various input/output (I/O) units, such as a magnetic tape storage 18 and a floppy disk device 19. The central control unit (CC) 12 contains therein, at least, an instruction prefetch buffer (IPB) 15 and a register for storing an operand (OPREG). The buffer 15 has a capacity of (n+1) words (0 to n).

According to the first prior art look-ahead method, the instruction prefetch buffer 15 is mounted inside the central control unit (CC) 12. Under this method, high-speed processing of the unit (CC) 12 can be maintained so long as the prefetch buffer 15 stores the preceding instructions. However, along with the increase in the processing speed of the cental control unit (CC) 12, access from the prefetch buffer 15 to the main memory (MM) 11 necessarily occurs very frequently. Under these circumstances, the memory bus 14 is placed in a state where the bus is busy dealing with only data communication between the buffer (IPB) 15 and the memory (MM) 11. As a result, the prefetch instructions can no longer be supplied to the prefetch buffer 15.

Figure 2:
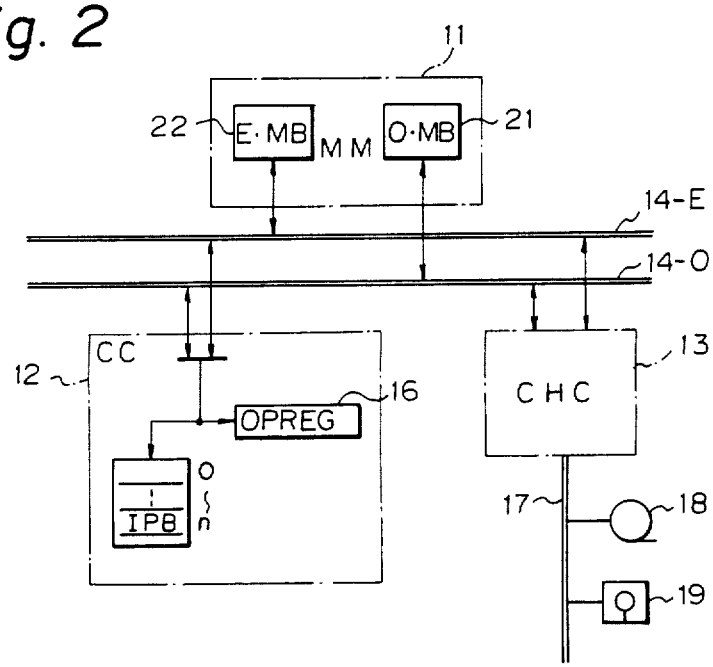
FIG. 2 illustrates a data processor system operated under look-ahead control according to a prototype method of the present invention.

FIG. 2 illustrates a data processor system operated under look-ahead control according to a prototype method of the present invention. In FIG. 2, members the same as those of FIG. 1 are represented by the same reference numerals or characters. This is also true of the later figures. The newly employed members are an odd memory bank (O-MB) 21 and an even memory bank (E-MB) 22 (both located inside the main memory (MM) 11), an even memory bus 14-E, and an odd memory bus 14-O. The above-described busy state of the memory bus (refer to 14 of FIG. 1) can be relieved by employing double memory buses, i.e., even and odd memory buses 14-E and 14-O. The double memory bank, i.e., the odd and even memory banks (MB's) 21 and 22, are set up in the memory (MM) corresponding to the odd and even memory buses 14-O and 14-E, respectively. The even memory bank is classified with even number addresses, while the odd memory bank is defined by odd number addresses. Thus, the traffic of each memory bus (14-E, 14-O) can be halved relative to that of the memory bus 14 of FIG. 1. However, the prototype method has the previously mentioned disadvantage of twice the interface lines used in the system of FIG. 1. It should noted here that each interface line is usually made of a bundle of about one hundred wires. In addition, each interface line is usually provided at each of the two ends with a connector having about one hundred pins. This means that the data processor system of FIG. 2 necessarily becomes large in size and high in cost and, therefore, suffers from very poor cost performance.

Figure 3:
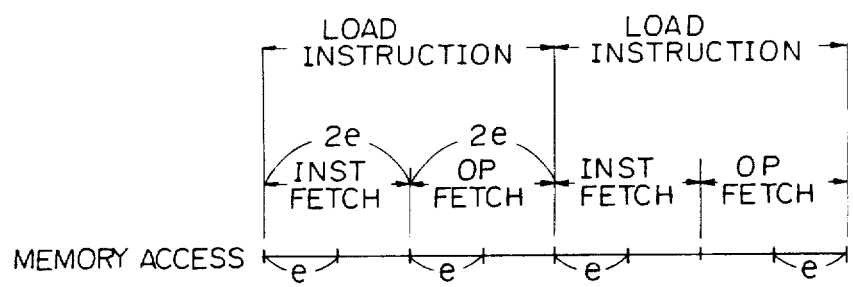
FIG. 3 is a time chart for explaining memory access according to prior art look-ahead control.

FIG. 3 is time chart for explaining the memory access according to prior art look-ahead control. FIG. 3 shows the case, as an example, where two load instructions are issued successively from the central control unit (CC). It should be understood, however, that an identical memory access is also applied in the case where, for example, a load instruction and a store instruction are issued successively. Along the memory access time chart, each graduation "e" defines a so-called machine cycle of the central control unit (CC). According to the first load instruction, an instruction fetch operation (INST FETCH) is achieved within the time 2e. Soon after this, an operand fetch operation (OP FETCH) is achieved within the time 2e. During this memory access, the central control unit (CC) performs the operations indicated by characters "X" and "NOP". The character "X" represents a calculation of the address used for achieving the next operand fetch, and the characters "NOP" represent no operation, i.e., no arithmetic operation performed by the unit (CC). The above-mentioned memory access regarding the first load instruction is true for the memory access regarding the second load instruction too. It is generally known that, in a Neumann-type data processor, data reading operations from the main memory according to a load instruction and data writing operations to the main memory according to a store instruction usually account for about half of the overall operations to be dealt with by the central control unit (CC). In view of the above, it is apparent that, if the above-mentioned load and store instructions can be executed at a higher speed than ever before, the processing capability of the data processor can be significantly increased. Usually, the access time for the main memory (MM) is within 2e (as shown in FIG. 3) or 3e. Conversely, according to the present invention, the access time, during the instruction fetch (INST FETCH), for the main memory (MM) is made as short as 1e. Therefore, the data processor system according to the present invention can be significantly increased in throughput and processing speed.

Figure 4:
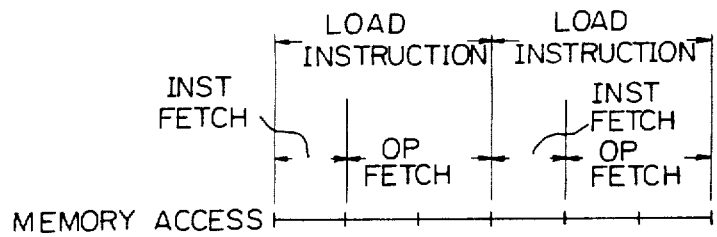
FIG. 4 is a time chart for explaining the memory access dealt with in the present invention.

FIG. 4 is a time chart for explaining a memory access dealt according to the present invention. The difference here is that each instruction fetch operation (INST FETCH) is completed within the time 1e, while each operand fetch operation (OP FETCH) is completed within the time 2e, as in FIG. 3. As a result, each load instruction can be executed within the time 3e, faster than the prior art execution time of the same by 1e (=4e−3e). Further, the speed-up of the memory access is achieved without introducing special means such as a high cost cache memory.

Figure 5:
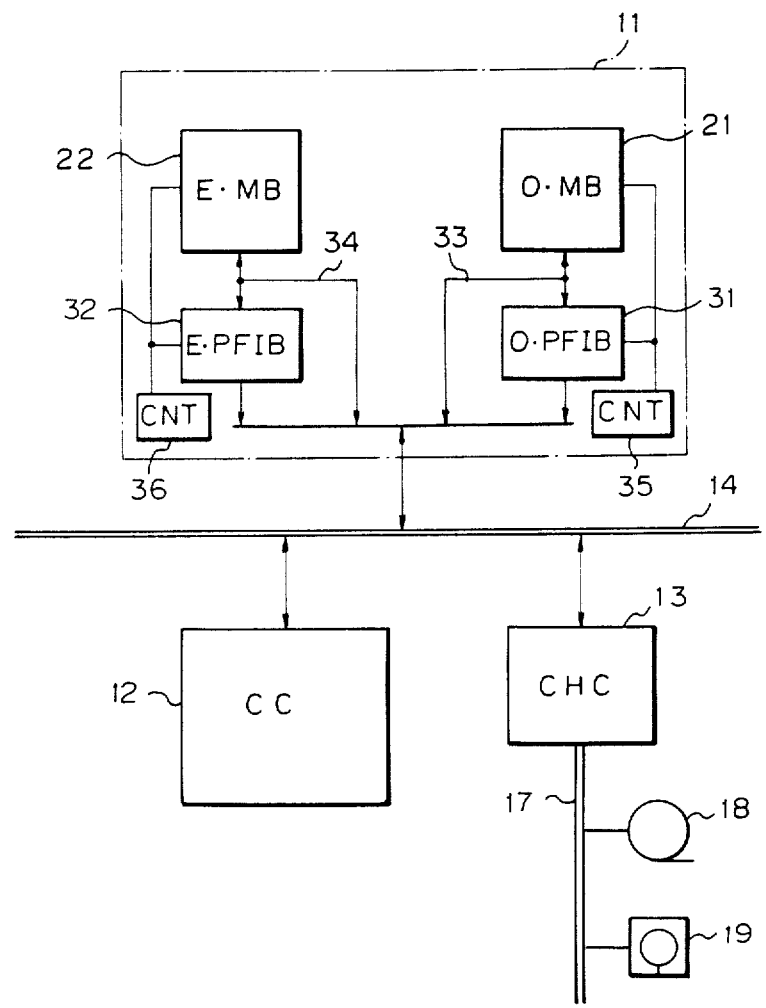
FIG. 5 illustrates a data processor system operated under look-ahead control according to the present invention.

FIG. 5 illustrates a data processor system operated under look-ahead control according to the present invention. The feature here is that the main memory (MM) 11 is set up having the odd memory bank 21 and even memory bank 22 and these two banks cooperate with respective instruction prefetch buffers, that is, the odd prefetch instruction buffer (O-PFIB) 31 and the even prefetch instruction buffer (E-PFIB) 32. As mentioned previously, the corresponding odd memory bank 21 and even memory bank 22 are divided in terms of the addresses, i.e., even number addresses and odd number addresses.

The odd prefetch instruction buffer (O-PFIB) 31 is bypassed by an odd operand path 33. Similarly, the even prefetch instruction buffer (E-PFIB) 32 is bypassed by an even operand path 34. Usually, the instructions are stored in series and sequentially one by one until the series of the instructions reaches a jump instruction. This means that, for an instruction such as a load instruction or store instruction, it is possible to determine instructions which will follow next. Therefore, the prefetch buffers 31 and 32 are useful for storing instructions which will be issued next. Contrary to this, it is impossible to determine the operand which will be used next, since the operands do not occur sequentially but at random. Therefore, prefetch buffers, such as the buffers 31 and 32, are not useful for the operand. In other words, the operands are dealt with under the real time mode and transferred directly between the memory banks 21 and 22 and the central control unit (CC) 12 via the operand paths 33 and 34, respectively.

As previously mentioned, the instructions, such as load and store, are set up sequentially one by one. Thus, the series of instructions are arranged in successive order. This means that a series of instructions are read from the memory banks 21 and 22 alternately and then alternately stored in respective prefetch instruction buffers 31 and 32. Accordingly, when either one of the prefetch instruction buffers 31 and 32 supplies the stored instruction to the central control unit (CC) 12, the other buffer operates to access the corresponding memory bank to obtain the instructions to be executed thereafter and stores them therein. These supply and accessing operations are achieved simultaneously. Therefore, the main memory (MM) has an operation speed seemingly twice the operation speed attained in the prior art main memory. This high speed operation of the main memory ensures a reduction in operation time for instruction fetch from 2e to 1e, as shown in FIG. 4. The main memory per se usually operates with a operation speed in the range of 100 through 200 ns. The prefetch instruction buffers 31 and 32, each made of a register, can usually operate with an operation speed in the range of 10 through 20 ns. In this case, if the main memory per se can operate with such a high operation speed, the prefetch instruction buffers would not be needed. However, such a high-speed main memory is usually too expensive and not suitable for commercial use.

The thus buffered instructions in the buffers 31 and 32 are fed alternately to the central control unit (CC) 12 under control of memory control logic circuits (CNT) 35 and 36.

Figure 6A:
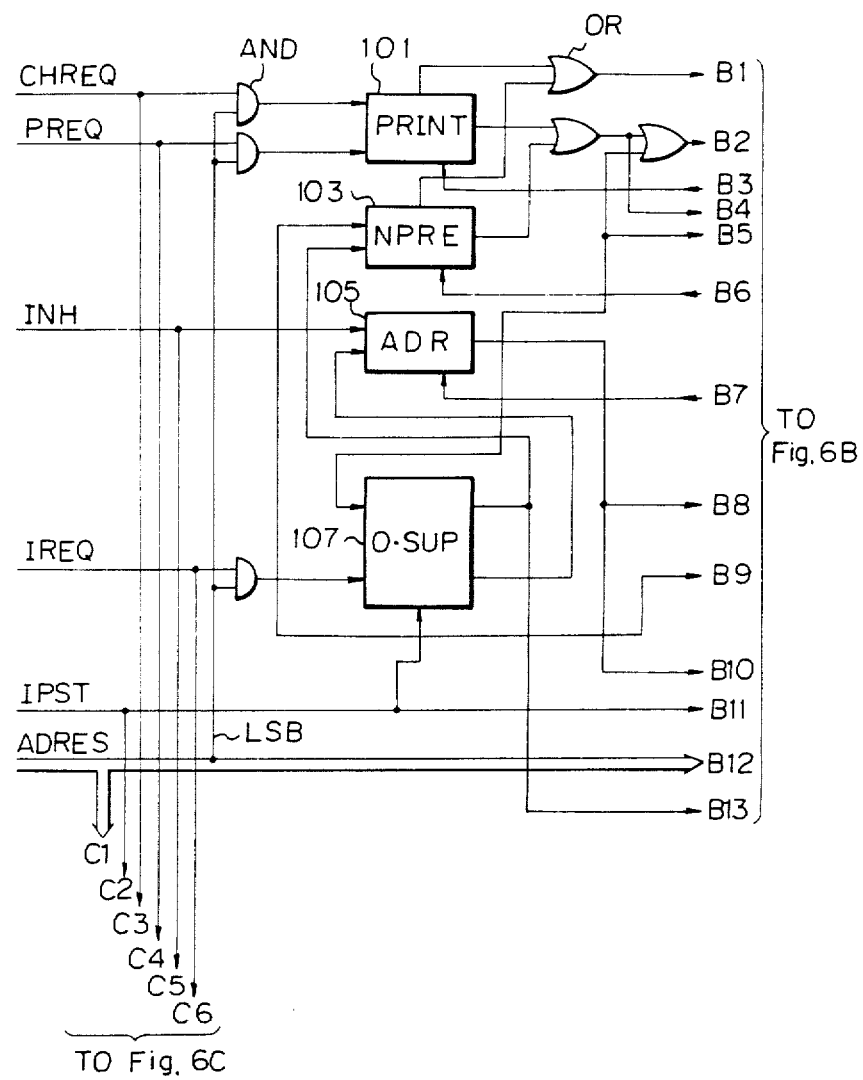
FIGS. 6A, 6B, 6C, and 6D are schematic block diagrams of the main memory according to the present invention.
Figure 6B:
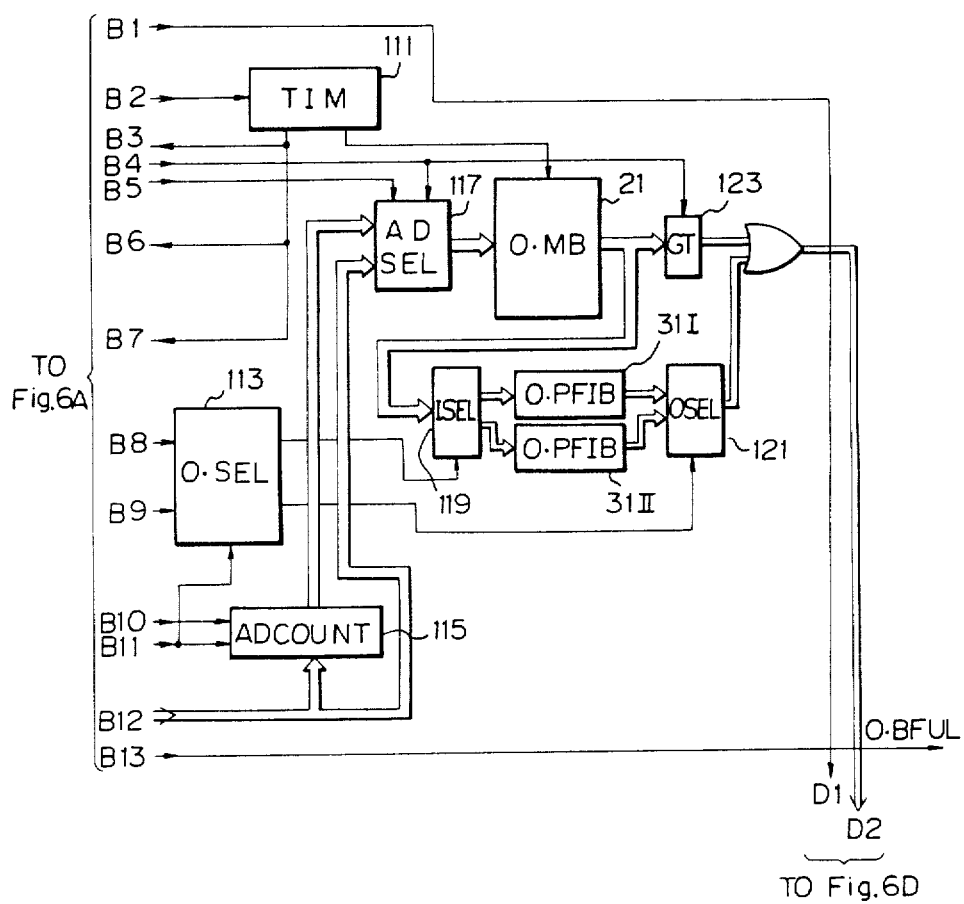

FIGS. 6A, 6B, 6C, and 6D are schematic block diagrams of the main memory according to the present invention. It should be understood that all the blocks illustrated in FIGS. 6A to 6D are more simply represented by the blocks 21, 22, 31, 35, and 36 shown in FIG. 5. The central control unit (CC) 12 of FIG. 5 sequentially reads the instructions stored in the main memory and executes the same sequentially. The main memory (MM) contains therein the odd memory bank (O·MB) 21 and even memory bank (E·MB) 22, which are specified by respective odd and even addresses. These banks 21 and 22 are shown in previous FIG. 5 and FIGS. 6B and 6D. The memory banks 21 and 22 are provided with the odd prefetch instruction buffer (O·P-FIB) 31 and the even prefetch instruction buffer (E·P-FIB) 32, respectively. The buffers 31 and 32 are preferably constructed with buffer pairs, i.e., 31I and 31II in FIG. 6B and 32I and 32II in FIG. 6D. The number of the odd prefetch instruction buffers (31) is not limited to two, as illustrated in FIG. 6B, but can be three or more. This is also true of the even prefetch instruction buffers (32) of FIG. 6D.

The odd prefetch instruction buffer 31 stores therein each instruction which has been read sequentially from the memory bank 21 preceding every issuance of an instruction fetch request (IREQ) from the central control unit (CC). This is also true of the even prefetch instruction buffers (32).

When the control unit (CC) issues the instruction fetch request (IREQ), the memory control logic circuits 35 and 36 control the prefetch instruction buffers 31 and 32 so as to produce the related instructions alternately therefrom.

The main memory contains therein supervisory circuits. One is an odd buffer supervising circuit (O·SUP) 107. The circuit 107 is operative to supervise whether or not the preceding instructions have been stored in the odd prefetch instruction buffer 31 and to produce the resultant supervisory information. The other is an even buffer supervising circuit (E·SUP) 108, which performs an operation similar to that of the above-mentioned circuit 107.

Figure 6C:
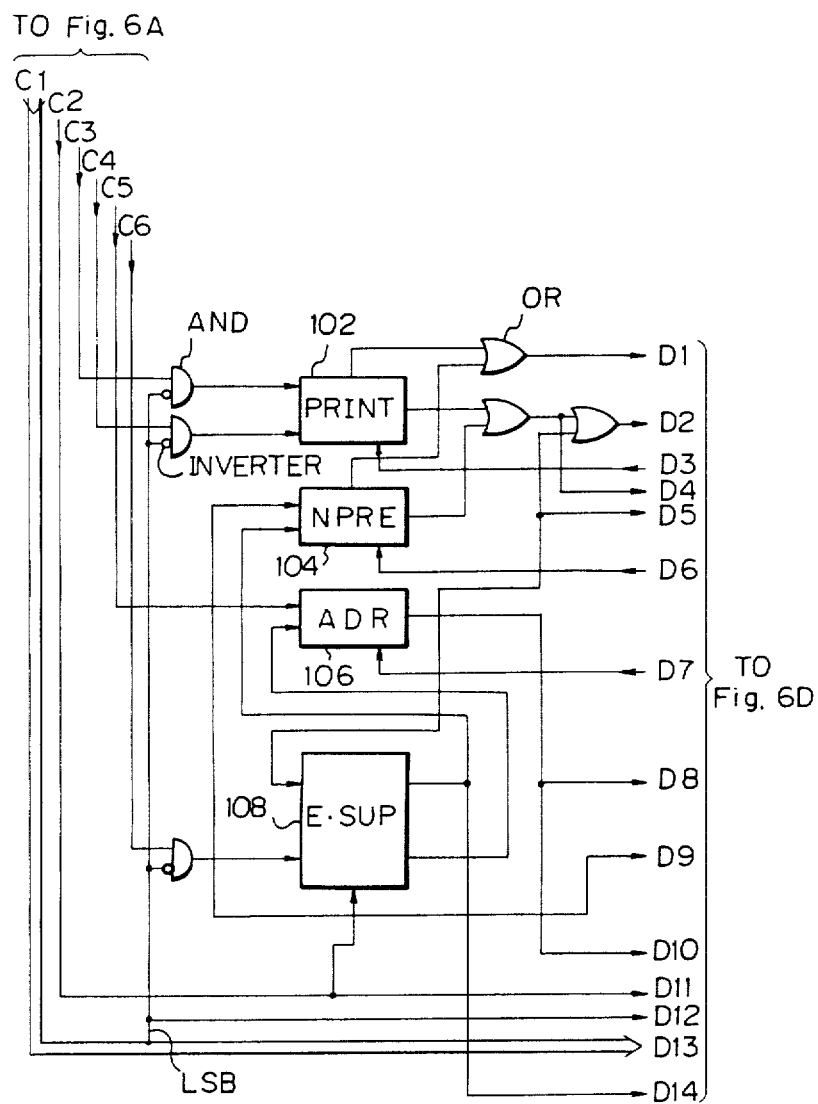
Figure 6D:
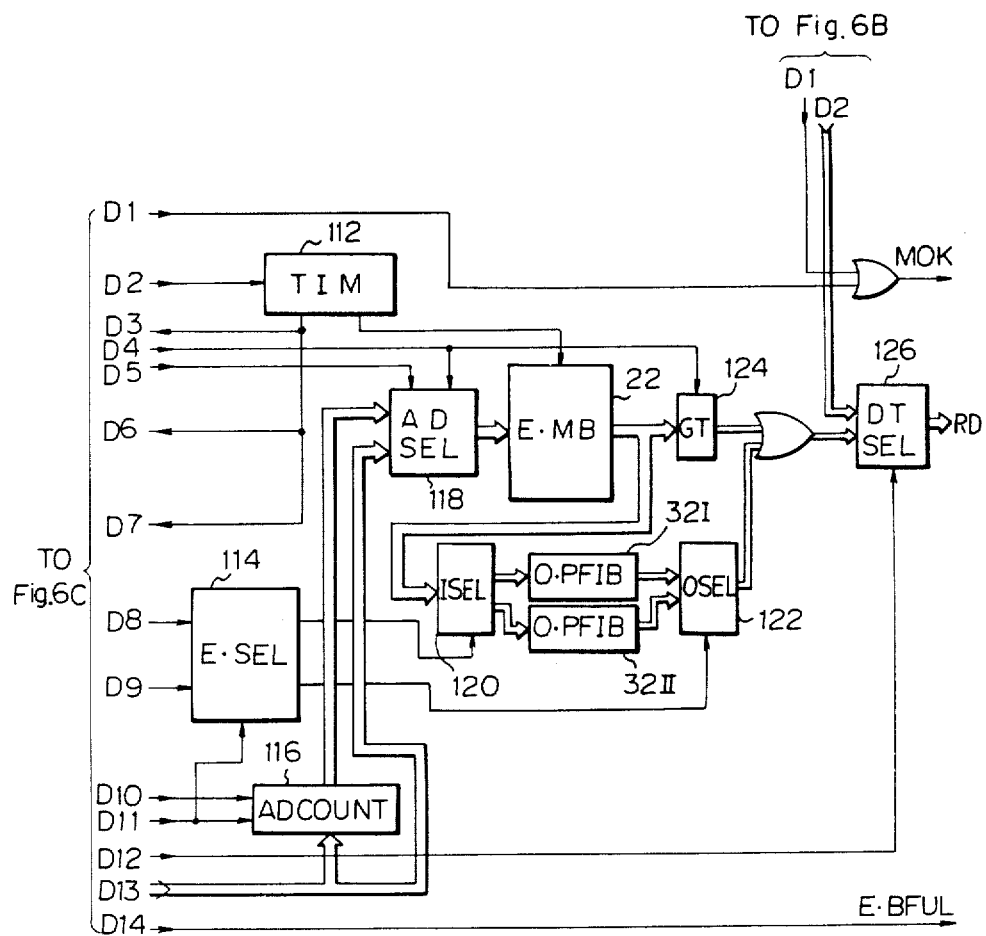

The resultant supervisory information from the circuit 107 and the resultant supervisory information from the circuit 108 are fed, on one hand, back inside the main memory and, on the other hand, to the central control unit (CC), such as shown by "O·BFUL" and "E·BFUL" located at the bottom right in FIGS. 6B and 6D, respectively. The information O·BFUL indicates that the odd prefetch instruction buffer 31 contains therein now at least one prefetch instruction. Similarly, the information E·BFUL indicates that the even prefetch instruction buffer 32 contains therein now at least one prefetch instruction. The central control unit (CC) watches the thus fed information (O·BFUL, E·BFUL) to also determine whether or not the advanced execution should be started in the unit (CC).

The main memory is supplied with an instruction prefetch inhibiting signal "INH" provided from the central control unit (CC) every time the unit (CC) issues an operand read/write request "PREQ".

The main memory is supplied with an instruction prefetch starting signal "IPST" provided from the central control unit (CC) preceding issuance of the instruction fetch request "IREQ" every time a discontinuity in the address for reading the instructions takes place, so that an advanced read operation for the instructions is initialized in the main memory.

The main memory is further supplied with a channel access request "CHREQ" provided from the channel control unit (CHC) 13 and with address information "ADRES" supplied from the central control unit (CC) or the channel control unit (CHC).

The memory control logic circuit (35, 36) in FIG. 5 is fabricated, in FIGS. 6A through 6D, with all members except for the memory banks 21, 22 and the prefetch instruction buffers 31, 32 and is operated in response to the variety of signals and requests shown at the left side in FIG. 6A. The memory control logic circuit functions, in other words, as an advanced read control circuit. The memory logic circuit (35, 36) is comprised of a priority interrupt circuit (PRINT) 101, a non-prefetch control circuit (NPRE) 103, an advanced read control circuit (ADR) 105, and the above-discussed buffer supervising circuit (O·SUP) 107, all illustrated in FIG. 6A, a timing control circuit (TIM) 111, an odd selection control circuit (SEL) 113, a prefetch instruction address counter (ADCOUNT) 115, an address selection circuit (ADSEL) 117, an input selector (ISEL) 119, an output selector (OSEL) 121, and a gate (GT) 123, all illustrated in FIG. 6B. The abovementioned members all pertain to the odd part. Identical members in the even part are shown in FIGS. 6C and 6D. In FIG. 6D, reference numeral 126 represents a data selector (DTSEL) for producing selected read data "RD" for the memory bus 14. The character "MOK", shown just above "RD", denotes a main memory access OK signal. In FIGS. 6A and 6C, each character "LSB" denotes a least significant bit of the address information "ADRES".

The priority interrupt circuit 101 (also 102) deals with the channel access request "CHREQ" and the operand read/write request "PREQ" with a higher priority than the instruction fetch request "IREQ". The non-prefetch control circuit 103 (also 104) is activated every time the instruction prefetch starting signal "IPST" is provided. To be more specific, the signal "IPST" is generated in cases where, for example, a discontinuity of addresses occurs, due to a jump instruction, an instruction to be not prefetched is provided, or no prefetch instruction is stored in the prefetch instruction buffers (31, 32). The advanced read control circuit 105 (also 106) receives the instruction prefetch inhibiting signal "INH" and adds the same to each operand read/write request "PREQ" to guarantee the completion of the operand fetch (refer to "OP FETCH" in FIG. 4) within the time 2e at any time. The buffer supervising circuit 107 (also 108) has already been explained and functions to supervise the state of the prefetch instruction buffer (31, 32). The timing control circuit 111 (also 112) works to produce the timing control clock pulses for the respective circuits. The selection control circuit 113 (also 114) determines into which prefetch instruction buffer 31I or 31II the prefetch instruction is to be stored, by way of the input selector 119. The selection control circuit 113 (also 114) determines, on the other hand, from which prefetch instruction buffer 31I or 31II the stored prefetch instruction is to be read, by way of the output selector 121. The prefetch instruction address counter 115 specifies the series of the addresses sequentially for reading the related instructions. The address selection circuit 117 produces the address, supplied from the counter 115, for specifying the prefetch instructions and the address for specifying the instructions which need not be prefetched or given as the address information "ADRES", selectively. The thus produced address accesses the memory bank 21.

The memory control logic circuit mentioned above is operative, with respect to the previously mentioned instruction prefetch inhibiting signal "INH", to receive the signal "INH" and inhibit a supply of the prefetch instruction to the prefetch instruction buffer 31 (same for 32).

The memory control logic circuit is operative, with respect to the previously mentioned resultant supervisory information from the supervising circuit 107 (same for 108), to store the prefetch instruction, read from the memory bank 21 (same for 22) in accordance with the resultant supervisory information, in the prefetch instruction buffer 31 (32) and then feed the thus stored prefetch instruction to the central control unit (CC) in response to the instruction fetch request "IREQ" supplied from the unit (CC).

As previously mentioned, the prefetch instruction buffer 31 (same for 32) is preferably constructed with two or more buffers, such as the buffers 31I and 31II (same for 32I, 32II). In this case, the memory logic control circuit is operative to, on the one hand, select one of these buffers (31I, 32II) to which the read prefetch instruction is to be stored and, on the other hand, select one of these buffers from which the stored prefetch instruction is to be fed to the central control unit (CC).

The prefetch instruction address counter 115 (same for 116) of the memory control logic circuit is operative to increment the counted address so as to sequentially read the prefetch instructions from the memory bank 21 (same for 22).

Figure 7A:
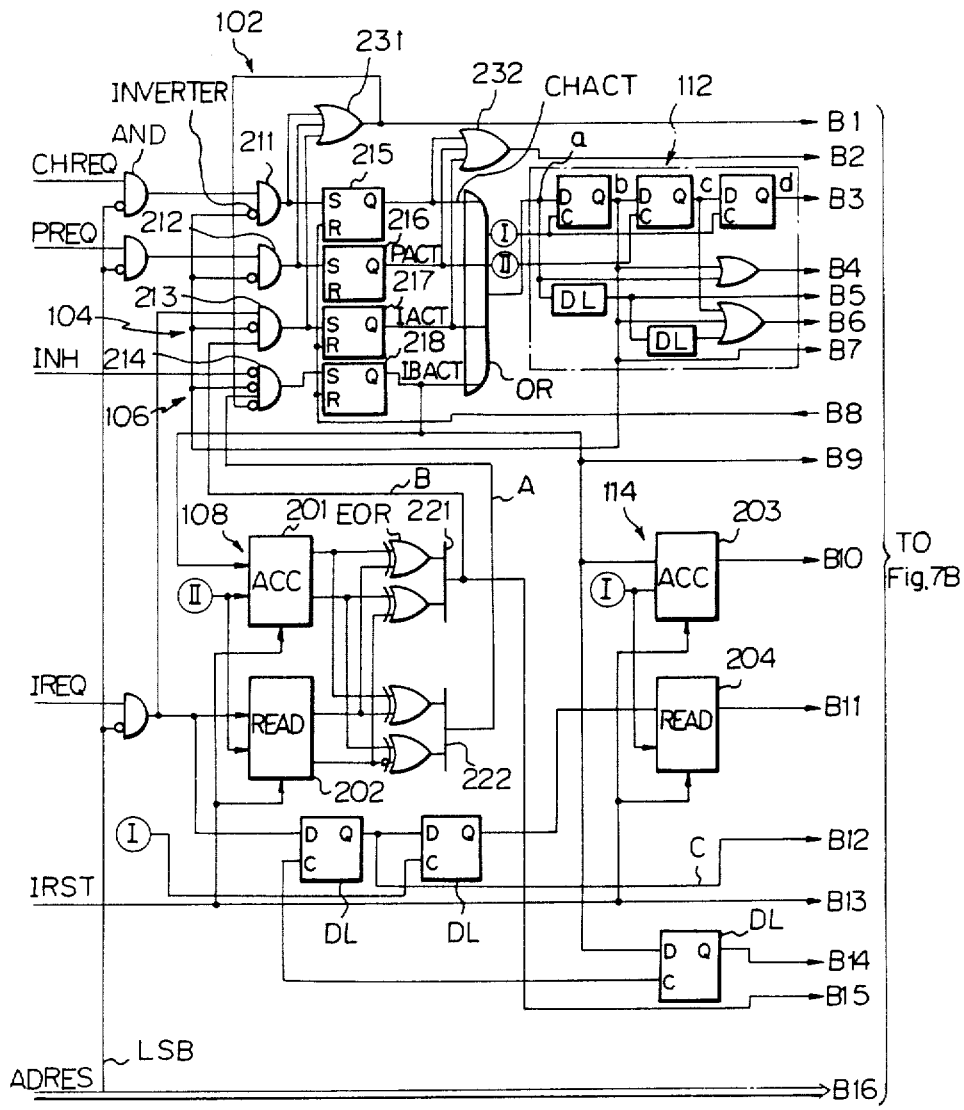
FIGS. 7A and 7B illustrate detailed examples of the main memory shown in FIGS. 5 and 6A through 6D according to the present invention.
Figure 7B:
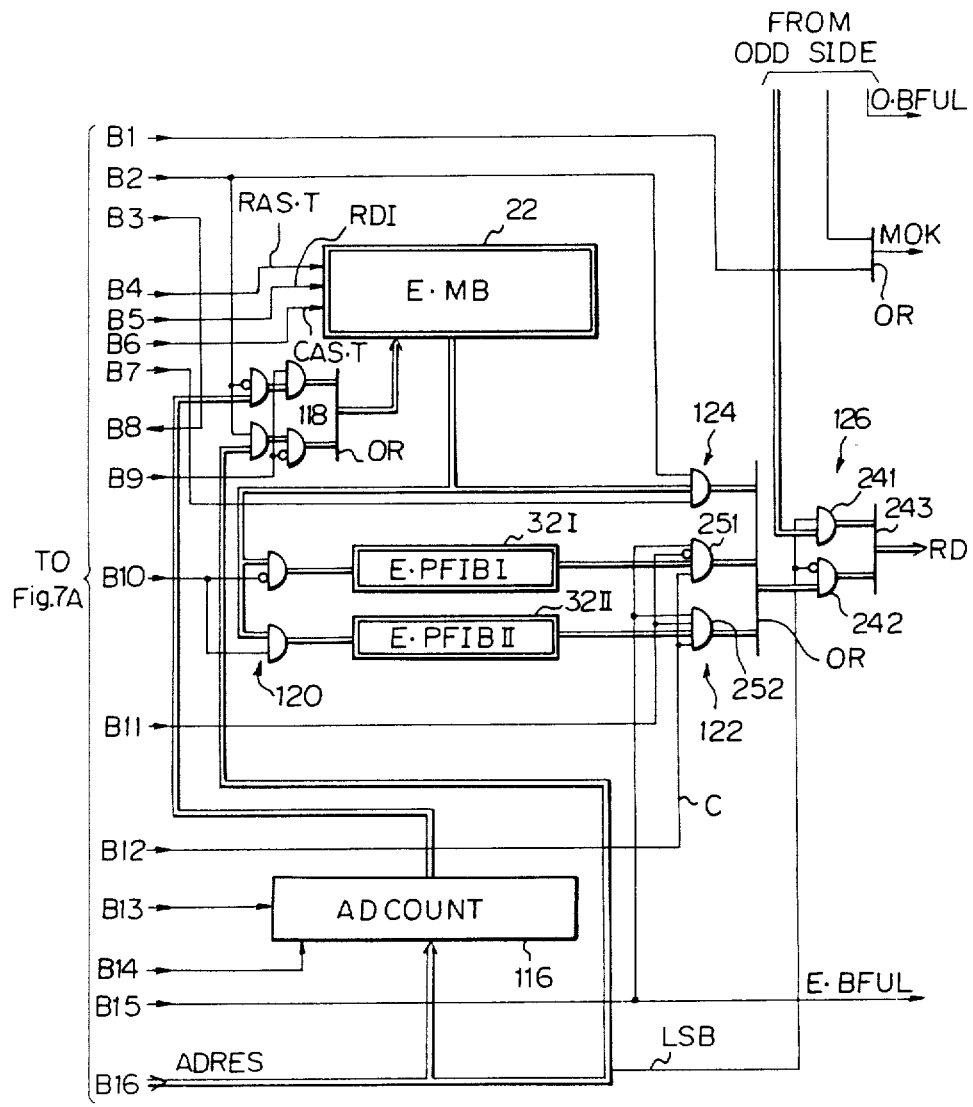

FIGS. 7A and 7B illustrate detailed examples of the main memory shown in FIGS. 5 and 6A through 6D, according to the present invention. It should be understood that, since the odd part of the main memory has substantially the same construction as that of the even part thereof, only the even part is illustrated in FIGS. 7A and 7B. Therefore, the constructions of FIGS. 7A and 7B correspond to those of previous FIGS. 6C and 6D. Identical members and signals are referenced by the same numerals and characters.

Figure 8:
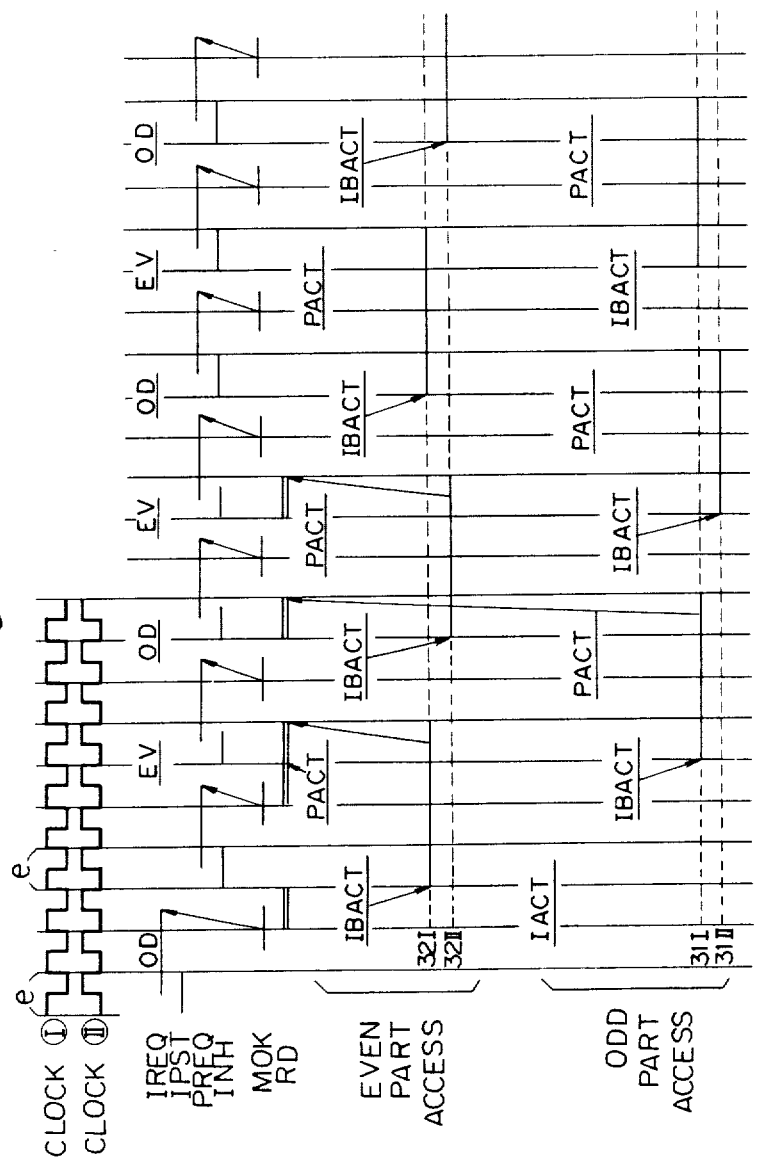
FIG. 8 is a time chart for explaining the operation of the main memory shown in FIGS. 7A and 7B.

FIG. 8 is a time chart for explaining the operation of the main memory shown in FIGS. 7A and 7B.

Figure 9:
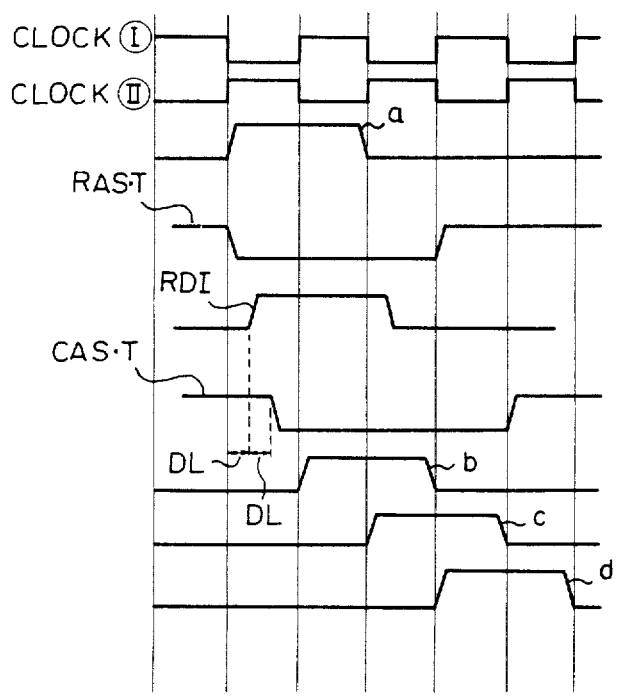
FIG. 9 is a time chart for explaining the operation of a timing control circuit shown in FIGS. 6B, 6D, and 7A.

FIG. 9 is a time chart for explaining the operation of the timing control circuit (TIM) shown in FIGS. 6B, 6D and 7A.

The operation of the main memory (MM) is as follows. When the main memory is to be initialized or a certain jump instruction is to be executed, the instruction fetch request "IREQ" is followed after the instruction prefetch starting signal "IPST" with a delay time e/2, as shown at the top left in FIG. 8. The character e denotes, as previously explained, a machine cycle (refer to FIG. 4). The delay time e/2 can be obtained with the use of clocks ① and  , which are different in phase by π. At such an initial stage, the contents stored in the prefetch instruction buffers 32I and 32 II are invalid, because these are the rest of the instructions to be executed before. At this time, therefore, the desired instruction must directly be read from the memory bank (E·MB) 22. For this, initialization is needed. For example, a heading address of the instruction to be executed is loaded in the prefetch instruction address counter (ADCOUNT) 116. The thus loaded heading address is then incremented by 2. The heading address has been supplied in the form of the address information "ADRES". It should be noted that the information "ADRES" indicates not only the address of the prefetch instruction, but also the address of other instructions which need not be prefetched. The buffer supervising circuit 108, including an accumulation counter (ACC) 201 and a read-out counter (read) 202, is also reset for the initialization by the instruction prefetch starting signal "IPST". When reset, the circuit 108 specifies the buffer 32I first. To cope with this, the selection control circuit 114, including an accumulation buffer indicating counter 203 and a read-out buffer indicating counter 204, is operative to, when the stored prefetch instruction is to be read, specify the buffer 32I first. The counters 201 and 202 are driven by the clock ①, while the counters 203 and 204 are driven by the clock ⓞ. Thus, when the main memory is to be initialized, the counters 201 through 204 are reset by the signal "IPST" and the address counter (ADCOUNT) 116 is preset with the heading address of the prefetch instruction. Soon after this, the instruction fetch request "IREQ" is generated from the central control unit (CC) and supplied to an AND gate 213. The AND gate 213 forms a part of the priority interrupt circuit (PRINT). The output from the AND gate 213, now opened by "IREQ", sets the corresponding SR flip-flop 217, which also forms a part of the circuit (PRINT) 112, and thereby produces therefrom a signal "IACT" which indicates that the request "IREQ" is now active. Then, the timing control circuit (TIM) 112 is triggered by the signal a corresponding to the set output of the flip-flop 217, the waveform of signal a is shown in FIG. 9. The signals b, c, and d appearing in the circuit 112 are depicted as respective waveforms in FIG. 9. The timing control circuit 112 further produces a row address strobe timing signal "RAS-T", a read indicating signal "RDI" (through a delay line DL), and a column address strobe timing signal "CAS-T", the waveforms of these signals are also illustrated in FIG. 9. The signals "RAS-T", "RDI" and "CAS-T" are supplied to the memory bank 22, and the bank 22 produces read data RD (an instruction) specified by the address supplied from the address selection circuit 118. The read data RD travels through the AND gate 124, the OR gate, and the data selector 126. When the main memory access OK signal "MOK" is returned to the central control unit (CC), the unit (CC) determines that the concerned request "IREQ" is now completed. The read data (RD) is depicted in row RD of FIG. 8.

Conversely, when the operand read/write request "PREQ" is generated, the prefetch operation must be stopped. This is because the operand read/write operation must be achieved under a real time mode by way of the operand path 33 or 34 shown in FIG. 5. In order to establish the real time mode, the prefetch operation must not be performed so as to start the operand read/write operation immediately. This also ensures the time sequence such as e→2e→e→2e, in which each operand read/write operation must always be completed in the time 2e. In short, when the operand request "PREQ" is generated, the prefetch operation must be stopped to guarantee the use of the memory bank for the operand request "PREQ". For this, the instruction prefetch inhibiting signal "INH" is introduced in the system. Each part of "INH" and "PREQ" is clarified in FIG. 8.

Even though such a signal as "INH" is introduced, the prefetch instruction buffers (31, 32) are still maintained in a full prefetch instruction state, as schematically shown in FIG. 8. The sequence of FIG. 8 assumes a condition where the load instructions and store instructions are continually and alternately issued from the central control unit (CC), which is the most severe case for the present invention. As seen from the sequence of FIG. 8, the signal "IBACT" is generated each time immediately before the signal "INH" is generated. The signal "IBACT" denotes that the prefetch instruction buffer must operate to achieve the instruction prefetch operation. The signal "IBACT" is produced from a flip-flop 218 which is set by the output from the AND gate 214. During the activation of this flip-flop 218, the instruction prefetch operation is being achieved. The AND gate 214 receives the signal "INH", at its input, through an inverter, and, thereby, when the signal "INH" is supplied, either the signal "IBACT" has already been generated or no signal "IBACT" is generated. Due to the relationship in sequence between the signals "INH" and "IBACT", maintenance of the operand fetch cycle is always guaranteed, in response to the request "PREQ", within 2e as shown in FIG. 4.

The signal "PACT" denotes that the operand read/write operation is being activated in response to the operand request "PREQ" with a delay time e from the generation of each request "PREQ", the signal "PACT" is produced from the flip-flop 216 when set by the output from the AND gate 212. The signal "CHACT" in FIG. 7A is produced from the flip-flop 215, which is driven by the output from the AND gate 211. The signal "CHACT" denotes that the access by the channel control unit (CHC) 13 is effective due to the generation of the channel access request "CHREQ".

Thus, when the signal "INH" is supplied to the main memory, the prefetch instruction buffer (31 or 32) has already been operated and the operation of the buffer (31 or 32) will soon be finished. Therefore, the signal "PACT" can follow thereafter. The above-mentioned relationship in sequence must stand not only in the even part, but also the odd part of the main memory. Accordingly, at least the signal "INH" is commonly supplied to the odd and even parts of the main memory. When the next signal "INH" is supplied, in FIG. 8, the signal "IBACT" in the even part is still not generated, while the signal "IBACT" in the odd part has already been generated and will soon cease. This ensures the insertion of the signal "PACT". In other words, the signal "PACT" is guaranteed to occur every time the request "PREQ" is generated, since the request "PREQ" is always accompanied by the signal "INH". In this case, the request "IREQ" is controlled such that the request is always executed within the time 1e, however, there is no relationship in sequence between the request "IREQ" and the signal "INH".

As mentioned above, the signal "IBACT" must cease every time the signal "INH" is generated, which is realized by the AND gate 214 (FIG. 7A). At this time, if the operand read request "PREQ" is supplied, the related read data RD (second occurrence in FIG. 8) is obtained.

The sequence of FIG. 8 shows that the odd part "IREQ" is generated first and then the signal "IACT" is started. The signal "IACT" is generated at one time when each request "IREQ" is issued and the related instruction fetch accesses are thereafter achieved in synchronization with the signals "IBACT".

In FIG. 7A, the accumulation counter (ACC) 201 counts the number incrementally every time either one of the prefetch instruction buffers (32I, 32II) stores therein the prefetch instruction. The read-out counter (READ) 202 counts the number incrementally every time either one of the prefetch instruction buffers (32I, 32II) feeds the stored instruction to the central control unit (CC) in response to the request "IREQ" issued therefrom. The counter 201 is incremented every time the signal "IBACT" is created by the flip-flop 218, which signal means that the prefetch operation is started. The counter 202 is incremented every time the prefetch instruction is fed to the central control unit (CC), which is equivalent to the fact that the unit (CC) has issued the instruction fetch request "IREQ". Therefore, the counter 202 is incremented with the reception of "IREQ".

Each of the counters 201 and 202 is comprised of a 2-bit counter producing 2-bit outputs. The 4-bit outputs, in all, from the counters 201 and 202 are applied to a digital comparator which is fabricated with, as illustrated in FIG. 7A, four exclusive OR gates (EOR's) and two OR gates 221 and 222. That is, the digital comparator detects the difference in count numbers between the counters 201 and 202. The OR gate 222 produces a signal A which becomes logic "0" under the condition where the count number of the counter 201 is larger than that of the counter 202. This means that the difference between the number of the stored prefetch instructions and the number of the read-out instructions is $\lceil 2 \rfloor$. Accordingly, the prefetch instruction buffers 32I an 32II are filled with the prefetch instructions. In this case, the signal "IBACT" should be terminated so as to stop the instruction prefetch operation. For this, the signal A, now logic "0", is applied to the AND gate 214. If the signal A is not logic "0", i.e., logic "1", the buffers 32I and 32II are not in a full state, and, therefore, the instruction prefetch operation should proceed. For this, the signal A of logic "1" opens the AND gate 214 to generate the signal "IBACT". When the counters 201 and 202 are commonly reset by the instruction prefetch starting signal "IPST", the difference in the number between the counters 201 and 202 is $\lceil 0 \rfloor$, and, therefore, the buffers 32I and 32II are activated, since these buffers store no data. When the number changes from $\lceil 0 \rfloor$ to $\lceil 1 \rfloor$, either one of the buffers 32I and 32II is filled with data (prefetch instructions). Then, the prefetch operation is further continued.

When the request "IREQ" is supplied, the counter 202 is incremented thereby, in which the prefetch instruction is read from either one of the buffers 32I and 32II. In this case, the digital comparator detects that the difference in number between the counters 201 and 202 is not ⌈2⌋, but ⌈0⌋ or ⌈1⌋. Then the OR gate 222 automatically produces the signal "A" of logic "1" to activate the prefetch operation ("IBACT").

In FIG. 8, the signal "IACT" is generated in the odd part main memory. The signal "IACT" is generated first when the request "IREQ" is supplied. In this case, no instructions are accumulated in the prefetch instruction buffers. Therefore, the signal "IACT" is supplied, via the OR gate 232, to the corresponding memory bank and immediately accesses the memory bank directly with the address "ADRES". On the other hand, in the even part, the signal "IBACT" has been generated, as shown in FIG. 8, and thus the related prefetch instruction has been stored in the prefetch instruction buffer 32I. The thus stored instruction is first used for the related request "IREQ". The following instructions are sequentially stored in the buffers 31I, 32II, 31II, and so on in response to the respective signals "IBACT" and then read therefrom sequentially. The signal "PACT" and the signal "IBACT" must not be generated simultaneously on the same side, odd or even. However, the signal "PACT" of the even (or odd) part and the signal "IBACT" of the odd (or even) part are allowed to occur simultaneously as shown in FIG. 8.

The OR gate 221 of the digital comparator produces a signal B which becomes logic "0" under the condition where the count numbers of the counters 201 and 202 become equal to each other. In other words, the signal B assumes logic "1" so long as any difference in number exists therebetween. This means that both prefetch instruction buffers 32I and 32II are filled with the instructions and, alternatively, at least one of these buffers is filled with the instruction. So long as the prefetch instruction or prefetch instructions are stored in the prefetch instruction buffer or buffers, the central control unit (CC) is guaranteed to operate with the operating speed of 1e. This information is sent, as the previous signal "E·BFUL", to the central control unit (CC), which signal indicates that at least one prefetch instruction exists in the instruction buffer (32). The central control unit (CC), when the signal "E·BFUL" is supplied, is guaranteed to perform its operation with the time 1e (FIG. 4), since the next instruction is immediately obtainable. Thus, the signal "A" from the OR gate 222 indicates, when logic "0", that the prefetch operation should be continued, while the signal "B" from the OR gate 221 indicates, when logic "1", that the operation within the time 1e of the central control unit (CC) should be continued.

The signal "B" is applied also to the AND gate 213. The AND gate 213 receives the instruction fetch request "IREQ" and activates the following flip-flop 217 to produce the signal "IACT", which indicates that the central control unit (CC) has issued the instruction access request. As mentioned before, when the output signal "B" is logic "1", it means that the prefetch instruction buffers 32I, 32II store at least one prefetch instruction. Therefore, the control unit (CC) can operate with the speed of 1e. On the other hand, when the signal "B" is logic "0", this closes the AND gate 213, and the timing control circuit 112 is not activated. This means that it is not necessary to obtain data directly from the memory bank 22. If, in a certain case, there is no prefetch instruction in the buffer (32), due to a certain combination of the instructions, the accessed data must directly be read from the memory bank 22 in response to the request "IREQ". When the instruction prefetch starting signal "IPST" is supplied, the counter 221 and 222 are reset and thus these produce output logic "0". Therefore, the signal "B" from the OR gate 221 is first logic "1". The signal "B" of logic "1" is used as the information "E·BFUL", which indicates that there is room in the buffer (32) to further store therein the prefetch instructions and, accordingly, the instruct prefetch operation should be maintained by the control unit (CC).

The counters 203 and 204, comprising the selection control circuit 114, are made of 1-bit counters. Therefore, each of the counters 203 and 204 produces output logics "0" and "1", which change successively, such as "0"→"1"→"0"→"1" . . . . The counter 203 determines into which buffer 32I or 32II the prefetch instruction should be stored first. The counter 204 determines from which buffer 32I or 32II the stored prefetch instruction should be read first. The counter 203 is incremented by one every time the signal "IBACT" is produced from the flip-flop 218, which signal indicates that the instruction prefetch operation must be performed by the buffer (32). On the other hand, the counter 204 is incremented by one every time the request "IREQ" is supplied from the central control unit (CC). For this, the request signal "IREQ" is applied to the counter 204 by way of two series-connected delay lines DL, made of D-flip-flops. Each of the delay lines creates a delay time of 1e in synchronization with the clock ⓓ. Thus, a 2e time delay is created in all.

The OR gate 232 shown at the top middle of FIG. 7A receives the signals "CHACT", "PACT", and "IACT", which are generated in response to the requests "CHREQ", "PREQ", and "IREQ", respectively. It should be noted that the signals "CHACT", "PACT", and "IACT" indicate operations which cannot be achieved under the prefetch mode. In other words, the operations to which the above three signals are concerned must be achieved under the real time mode. This is because these operations exhibit no continuity as with load and store instructions. Accordingly, data concerning these signals must be read directly from the memory bank 22.

The OR gate 231 shown at the top middle of FIG. 7A receives the outputs from the AND gates 211, 212, and 213 and closes, when at least one of these outputs is received, the AND gate 214 to avoid a conflict between the prefetch operation, due to the signal "IBACT", at the memory bank and the direct read operation, due to the above-mentioned three signals, at the same memory bank.

The flip-flops 215 through 218 are commonly reset by the output from the timing control circuit 112. Once an operation due to one of the signals "CHACT" through "IBACT" is stored, other operations due to the remaining signals must wait until the started operation is finished. For this, the flip-flops 215 through 218 are all reset by the timing control circuit 112.

The data selector 126 is made of AND gates 241 and 242 and an OR gate 243. The AND gates 241 and 242 open and close, respectively, and vice versa, in response to the LSB of the address, which LSB separates the odd part and the even part from each other. The odd part read data RD and the even part read data RD are OR'ed at the OR gate 243. The access, by the requests "CHREQ" and "PREQ", to the memory bank 22 is made with the use of the address "ADRES" by means of the address selection circuit 118. On the other hand, the access, by the instruction prefetch request (IREQ→IBACT), to the memory bank 22 is made with the use of the address supplied from the prefetch instruction address counter 116, by means of the address selection circuit 118. Thus, the circuit 118 operates such that the address for the non-prefetched instruction and the address for the prefetch instruction are produced therefrom selectively. In FIG. 7B, the circuit 118 is made of four AND gates and one OR gate.

The gate 124 (FIG. 7B) is made of an AND gate and is opened by the signal "b" (FIG. 9) and the output signal from the OR gate 232 (FIG. 7A). The output selector 122 includes of AND gates 251 and 255, which are opened alternately when the signal "IREQ" with a time delay 1e is supplied from the former delay line DL shown at bottom side in FIG. 7A. During the prefetch operation, control by the timing control circuit 112 is not available. Therefore, the output selector 122 is directly triggered by the signal "C" from the delay line DL.

Usually, the central control unit (CC) determines its operation speed based on the main memory access OK signal "MOK" (FIGS. 6D and 7B). To be specific, the speed of the internal control of the control unit (CC) is determined every time the signal "MOK" is received thereby. According to the present invention, the signals "O·BFUL" and "E·BFUL" are also applied to the central control unit (CC). If the "BFUL" signal is applied to the unit (CC), the unit (CC) determines for itself, every time the instruction fetch request "IREQ" is issued, that the internal control operation should be achieved within the speed of 1e or 2e. If the "BFUL" signal exists, the unit (CC) can be operated with the speed of 1e. If no such "BFUL" signal exists, the unit (CC) determines by itself that the internal control operation, relating to the "IREQ" now issued, should be achieved with the speed of 2e. Conversely, when the request "CHREQ" and "PREQ" are supplied, the unit (CC) determines by itself the internal control operation speed in response to the reception of the "MOK" signal.

Figure 10:
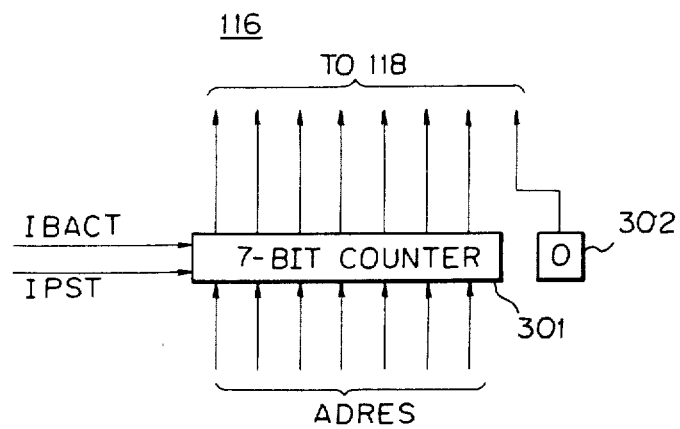
FIG. 10 illustrates a detailed example of a prefetch instruction address counter of FIG. 7B.

FIG. 10 illustrates a detailed example of the prefetch instruction address counter (ADCOUNT) of FIG. 7B. The counter is comprised, when an 8-bit address is used, of a 7-bit counter 301 and a 1-bit register 302, which fixedly produces a logic "0", as the lowest order bit of the address.

Figure 11:
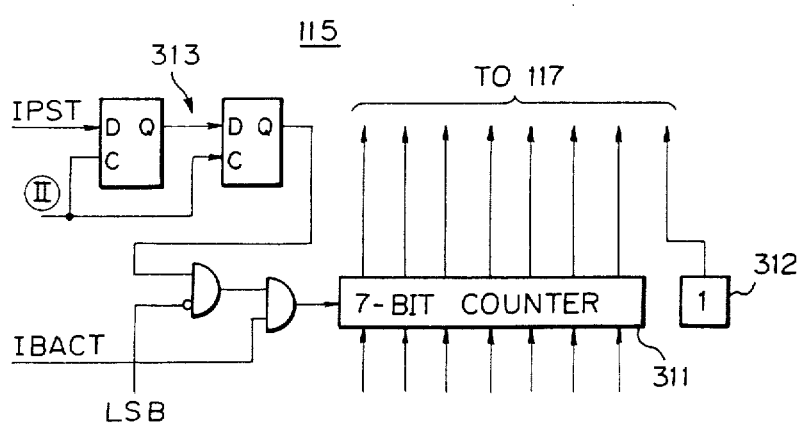
FIG. 11 illustrates a detailed example of a prefetch instruction address counter shown in FIG. 6B.

FIG. 11 illustrates a detailed example of the prefetch instruction address counter (ADCOUNT) shown in FIG. 6B. The prefetch instruction address counter 115 is comprised, when an 8-bit address is used, of a 7-bit counter 311, a 1-bit register 312, which fixedly produces a logic "1", as the lowest order bit of the address, and a timing control logic part 313. The logic part is fabricated with, as illustrated, two AND gates and two D-flip-flops. Referring to FIGS. 10 and 11, if the instruction prefetch starting signal "IPST" is supplied with the head address of an odd number, in the odd part of the main memory, it is necessary to start executing the related prefetch operation when the next address is supplied. Therefore, the memory bank 21 (FIG. 6B) is accessed after the counter 115 is counted up by the reception of the signal "IBACT". This is also true of the even part of the main memory.

Contrary to the above, if the instruction prefetch starting signal "IPST" is supplied with the heading address not an odd number, as before, but an even number, the following operation is perfomed. In this case, the heading address has logic "0" as its lowest order bit. The address to be set, by the signal "IPST", for the odd part of the main memory is already used as the address for the prefetch operation, since the related counter 115 (refer to FIG. 11) has logic "1" at its lowest order bit. Accordingly, the count-up operation by the signal "IBACT" must be inhibited, which signal "IBACT" will come next to the signal "IPST". For this, in the logic part 313, the signal "IPST" is logged in time by 3/2e with the use of the clock ⓞ at the D-flip-flops and the AND logic operation is performed with the signal "LSB". Thereby, the first count-up operation is inhibited when the even number address is initially set for the odd part of the main memory. Conversely, under the same circumstances, such inhibition of the count-up is not needed in the even part of the main memory, but the count-up operation must be continued.

As explained above in detail, the present invention provides a data processor system having look-ahead control without increasing the cost. Therefore, the high access speed of the instructions can be attained with good cost performance.

We claim:

1. A data processor system, comprising:

a main memory; and a central control unit, operatively connected to said main memory, the central control unit reading instructions stored in the main memory using addresses having even and odd addresses, executing the read instructions and producing an instruction prefetch starting signal used for initializing an advanced read control in said main memory, every time a discontinuity occurs in a flow of the addresses, such as an address jump, and the instruction prefetch starting signal being issued preceding the issuance of an instruction fetch request; and said main memory comprising:

an even memory bank and an odd memory bank which are addressed by the even addresses and odd addresses, respectively, the two memory banks operating independently of each other and operatively connected to said central control unit;

an even prefetch instruction buffer and an odd prefetch instruction buffer operatively connected to the even and odd memory banks, respectively, the even and odd prefetch instruction buffers being operatively connected to said central control unit, even supervising circuit means conneced to said central control unit and said even prefetch instruction buffer and odd supervising circuit means connected to said central control unit and said odd prefetch instruction buffer and both for producing resultant supervisory information indicating whether the prefetch instructions are stored in advance in the prefetch instruction buffers, respectively, allowing instruction fetch by the central control unit based only on the instruction fetch request, said main memory reading instructions sequentially from the even and odd memory banks, usings the odd and even addresses from said central control unit, based on said instruction prefetch starting signal and preceding issuance of the instruction fetch request from the central control unit, and storing the read instructions in the corresponding prefetch instruction buffers, and said main memory including a memory control logic circuit, connected to said central control unit and said supervising circuit means, for controlling said main memory, and the memory control logic circuit achieves the advanced read operation of the read instructions from the prefetch instruction buffers in accordance with the resultant supervisory information from the supervising circuits, to store the thus read instructions in said odd and even prefetch instruction buffers and, then feeds the thus stored prefetech instructions from the respective odd and even prefetch instruction buffers to said central control unit in response to the instruction fetch request issued by the central control unit, by controlling the even and off prefetch instruction buffers, in response to the instruction fetch request issued from the central control unit, sich that the stored prefetch instructions are produced alternately from the even and odd prefetch instruction buffers and supplied to the central control unit.

2. A system as set forth in claim 1, wherein the resultant supervisory information produced by said supervisory circuit means is supplied inside the main memory for control of the instruction prefetch operation and to the central control unit for the internal control thereof.

3. A system as set forth in claim 1, wherein said main memory receives a variety of instructions from the central control unit, including an operand read/write request when said main memory receives the operand read/write request, the central control unit issues an instruction prefetch inhibiting signal preceding every issuance of the operand read/write request from the central control unit.

4. A system as set forth in claim 3, wherein said main memory further includes a memory control logic inhibit circuit, connected to said central control unit and said memory control logic circuit, for controlling said main memory, and said memory control logic inhibit circuit receives an instruction prefetch inhibiting signal and inhibits the advanced read operation of the read instruction.

5. A system as set forth in claim 1, wherein each of said even and odd prefetch instruction buffers comprises a plurality of buffers, and the memory control logic circuit includes a selection control part, connected to said buffers, said memory banks and said central control unit, said selection control part determines a one of the buffers into which the prefetch instruction is to be stored and a one of the buffers from which the stored prefetech instruction is to be supplied to the central control unit.

6. A system as set forth in claim 1, wherein said memory control logic circuit further includes an even prefetech instruction address counter and an odd prefetch instruction address counter, each of the prefetch instruction address counters being automatically incremented to sequentially specify the addresses used for performing the advanced read operation and being operatively connected to the respective odd and even memory banks and to said central control unit.

7. A data processor system, comprising:
a main memory; and
a central control unit, the central control unit issuing a prefetech starting signal and an instruction request signal for reading instructions stored in the main memory and executing the thus read instructions; and said main memory comprsiing:
an even memory bank and an odd memory bank which are specified by even addresses and odd addresses, the two memory banks operating independently of each other and operatively connected to said central control unit;

an even prefetch instruction buffer and an odd prefetch instruction buffer operatively connected to said even and odd memory banks, respectively;

an even prefetch instruction address counter and an odd prefetch instruction address counter, each counter operatively connected to respective odd and even memory banks and operative to specify the address at which the prefetch instruction is accessed in the respective memory bank;

an even supervising circuit and an odd supervising circuit respectively connected to said even and add prefetch instruction buffers and said central control unit, each of the supervising circuits operative to provide resultant supervisory information indicating whether the prefetch instructions are stored in advance of instruction request signal in the corresponding prefetech instruction buffer, preceding issuance of the instruction fetch request signal by said central control unit; and an advanced read operation control circuit, said advanced read operation control circuit automatically, first, increments the prefetch instruction address counters, second stores the prefetched instructions read with the incremented address from the respective memory bank in the respective prefetch instruction buffer and, third transfers, responsive to the instruction fetch request signal, the requested prefetched instruction, from the corresponding odd or even prefetch instruction buffer to said central control unit.

8. A system as set forth in claim 7, wherein said central control unit produces the instruction prefetch starting signal, preceding the issuance of the instruction fetch request signal, every time a discontinuity occurs in a flow of addresses and said main memory, prior to the first through third operations of said advanced read operation control circuit, firsst, receives the instruction prefetch startingsignal, second, loads a heading address, supplied from the central control unit, of the instructions to be read in advance of instruction fetch request signal, into the corresponding odd and even prefetch instruction address counter, and, third, resets said odd and even supervising circuits, so that the advanced read operation control in said main memoryis initialized.

9. A system as set forth in claim 7, wherein each of said even and odd prefetch instruction buffers comprise a plurality of buffers, and the advanced read operation control circuit includes a selection control part respectively connected to said buffers, to said memory banks and to said central control unit, said selection control part, determines a one of the buffers into which the prefetch instruction is to be stored and, a one of the buffers from which the stored prefetch instruction is to be supplied to said central control unit.

10. A system as set forth in claim 9, wherein said central control unit produces the instruction prefetch starting signal preceding issuance of the instruction fetch request signal, every time a discontinuity occurs in a flow of addresses, and said main meory, prior to the first through third operations of said advanced read operation control circuits, first, receives the instruction prefetch starting signal, second, loads a heading address, supplied from said central control unit, of the instructions to be read in advance of instruction fetch request signal, into the respective odd and even prefetch instruction address counter, and third, resets both said odd and even supervising circuits and said selection control part, so that the advanced read operation control in said main memory is initialized.

11. A data processor, comprising:
   a central control unit producing an instruction request signal;
   a bus connected to said central control unit; and a memory connected to said bus, said memory, comprising:
   an odd memory bank being addressed only by odd memory addresses;
   an even memory bank being addressed only by even memory addresses;
   an odd instruction prefetch buffer operatively connected to said odd memory bank and storing contents from said off memory bank;
   an even instruction prefetch buffer operatively connected to said even memory bank and storing contents from said even memory bank;
   selection means, operatively connected to said odd and even instruction prefetch buffers and said bus, for alternately selecting and transferring the contents of said odd and even instrtuction prefetch buffers to said central control unit over said bus based on said instruction request signal; and
   prefetching means, operatively connected to said odd and even instruction prefetch buffers and said odd and even memory banks, for loading the unselected one of the instruction prefetch buffers, not selected by said selection means, from the respective memory bank with the next sequential instruction while said selection means is transferring the contents to said central control unit from the selected one of instruction prefetch buffers.

* * * * *

UNITED STATES PATENT AND TRADEMARK OFFICE
CERTIFICATE OF CORRECTION

PATENT NO. : 4,755,933
DATED : July 5, 1988
INVENTOR(S) : Tooru Teshima et al.

It is certified that error appears in the above-identified patent and that said Letters Patent is hereby corrected as shown below:

Column 3, line 10, "cental" should be --central--;
        line 40, after "should" insert --be--.
Column 5, line 12, "a" should be --an--.
Column 8, line 12, "and    , which" should be --and II, which--.
Column 9, line 62, after "also" insert --in--.
Column 10, line 51, "an" should be --and--.
Column 13, line 16, delete "of";
        line 60, "head" should be --heading--;
        line 60, "of" (1st occurrence) should be --having--.
Column 14, line 64, "usings" should be --using--;
Column 15, line 18, "off" should be --odd--;
        line 20, "sich" should be --such--;
        line 54, "prefetech" should be --prefetch--;

UNITED STATES PATENT AND TRADEMARK OFFICE
CERTIFICATE OF CORRECTION

PATENT NO. : 4,755,933

DATED : July 5, 1988

INVENTOR(S) : Tooru Teshima et al.

It is certified that error appears in the above-identified patent and that said Letters Patent is hereby corrected as shown below:

line 58, "tech" should be --tch--;

line 68, "prefetech" should be --prefetch--.

Signed and Sealed this

Thirteenth Day of December, 1988

Attest:

DONALD J. QUIGG

Attesting Officer

Commissioner of Patents and Trademarks